Figure 1:
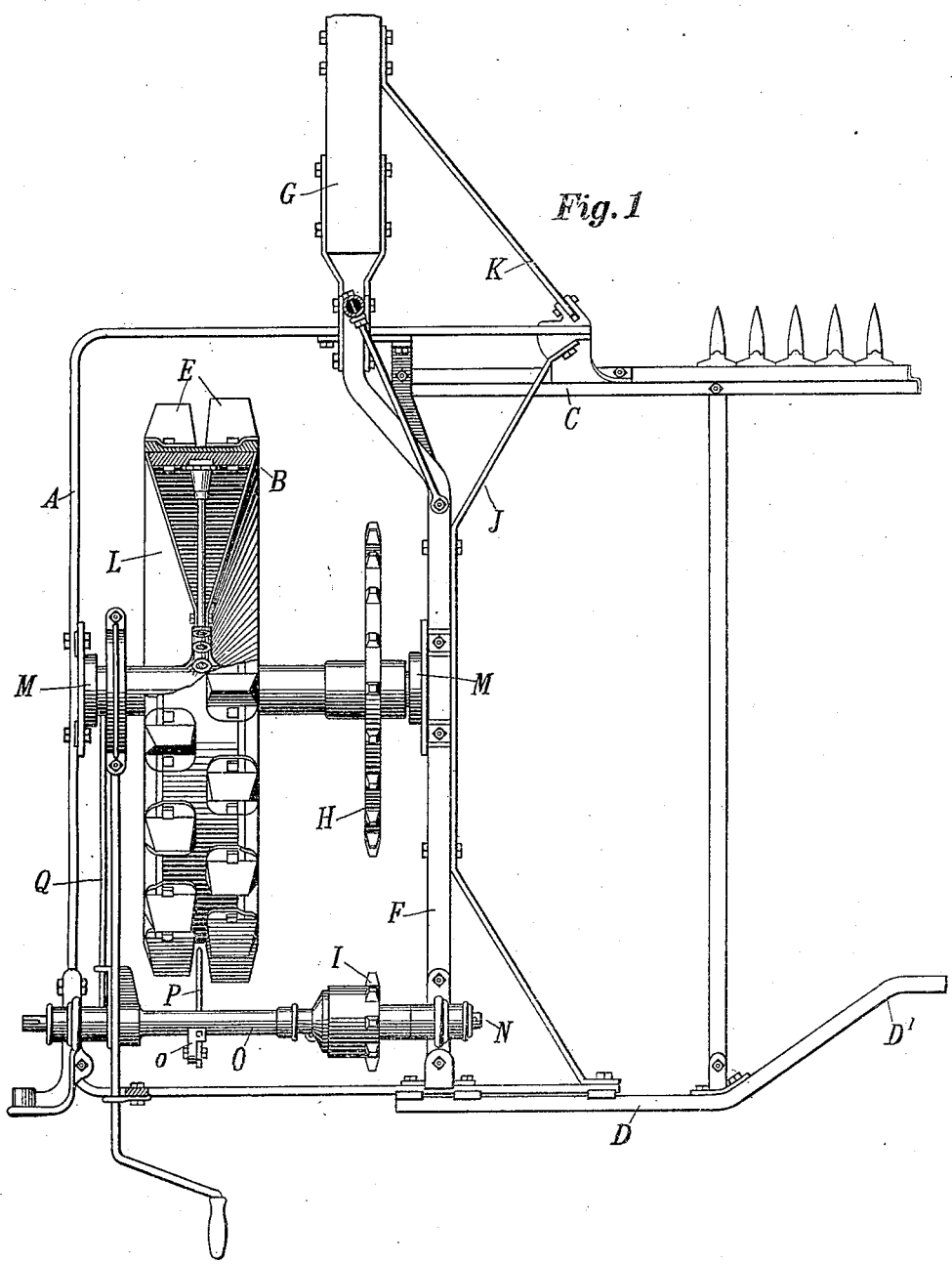

No. 648,881. Patented May 1, 1900.
J. W. PRIDMORE.
RICE HARVESTER.
(Application filed June 2, 1898.)

(No Model.) 2 Sheets—Sheet 1.

WITNESSES: INVENTOR
Lewis H Williams John W Pridmore
John M. Culver BY
R. B. Swift,
ATTORNEY.

No. 648,881. Patented May 1, 1900.
J. W. PRIDMORE.
RICE HARVESTER.
(Application filed June 2, 1898.)
(No Model.) 2 Sheets—Sheet 2.
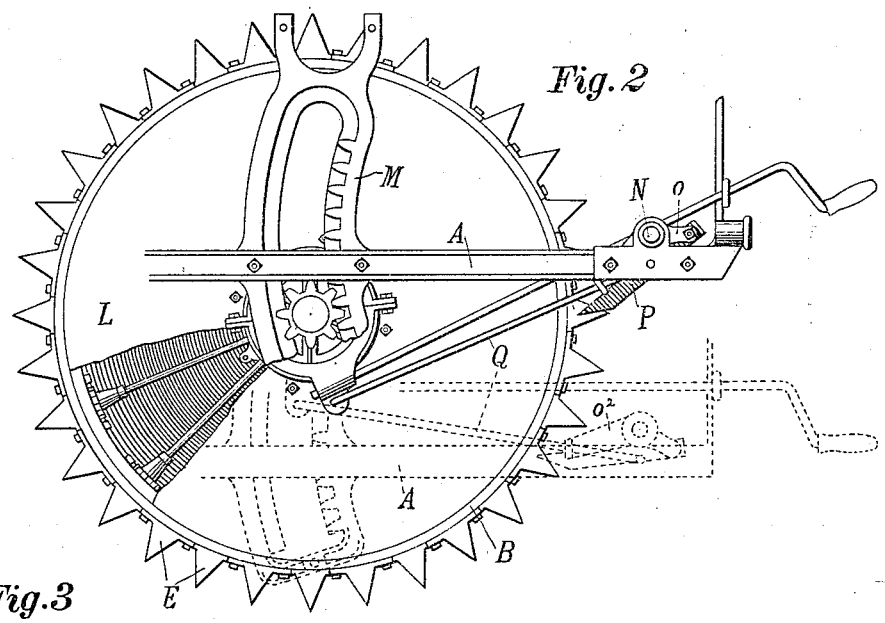
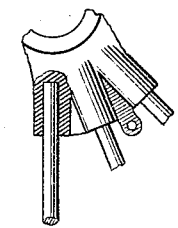
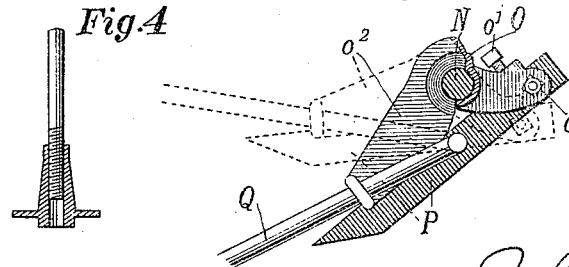
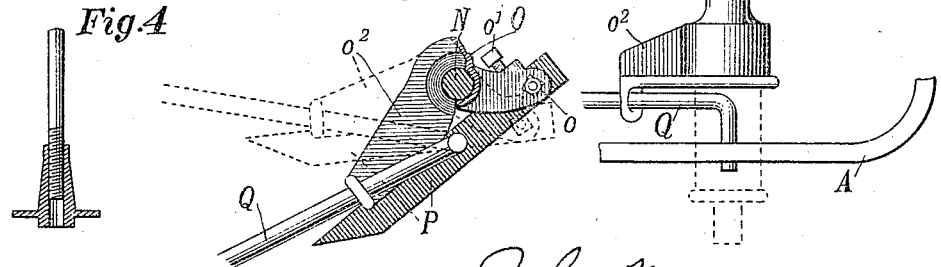
WITNESSES: INVENTOR
BY
ATTORNEY.

UNITED STATES PATENT OFFICE.

JOHN W. PRIDMORE, OF CHICAGO, ILLINOIS, ASSIGNOR TO THE McCORMICK HARVESTING MACHINE COMPANY, OF SAME PLACE.

RICE-HARVESTER.

SPECIFICATION forming part of Letters Patent No. 648,881, dated May 1, 1900.

Application filed June 2, 1898. Serial No. 682,343. (No model.)

*To all whom it may concern:*

Be it known that I, JOHN W. PRIDMORE, a citizen of the United States, residing at Chicago, in the county of Cook and State of Illinois, have invented a new and useful Improvement in Machines for Harvesting Rice, of which the following is a specification.

My invention relates more particularly to improvements in harvesting-machines in which the machine is supported upon wheels and drawn over the surface of the ground to cut the standing crop. Rice is usually grown on inundated or overflowed land, the soil at harvest time being very soft or covered with water and the wheels of the machine sink into the mud to considerable depths. The straw and trash upon the surface of the ground mixes with the mud and hangs onto the wheels and unless the tread-face of the wheel is provided with projecting lugs the wheels will slip and not drive the devices on the machine. The trash and dirt that adheres to the wheel and is carried by it has heretofore caused much trouble by dropping into the gearing, winding about the shafting, adhering to the face of the wheel, filling the spaces between the lugs, and increasing the diameter of the wheel, so that it has no room to revolve in the frame.

The objects of my improvement are, first, to provide a wheel to the side of which the dirt will not adhere and which sides will not increase the draft by forcing the ground from the track that has been cut by the tire; second, to provide a clearer or scraper for the wheel to remove any dirt that may adhere to it; third, to protect the shafting from trash; fourth, to remove the gearing away from the wheel, and, fifth, to so construct the frame of the harvester as to allow a wheel of large diameter to be used and the gearing to be separated from it and still have sufficient strength to stand the great strain that is thrown upon it in the muddy fields through which it must be drawn. I attain these objects by mechanism illustrated in the accompanying drawings, in which—

Figure 1 is a top view of so much of the framework of the harvester and main driving-wheel as is necessary to show my improvements. The main wheel is partly broken away to show its construction. Fig. 2 is a side view of the main wheel and part of the framing of the harvester. In dotted lines is shown the position of the frame and clearer device when they are lowered on the wheel. Figs. 3, 4, 5, and 6 are detail views showing the construction of some of the parts.

Similar letters refer to similar parts throughout the several views.

The main frame of the machine is formed of one piece of channel-iron A, which encircles the main wheel B on three sides and is bolted to the platform-sill C in front and the platform-sill D in the rear. The wheel B has fitted to its tread-face long lugs E. These lugs practically increase the diameter of the wheel and make necessary increased room for the revolution of the wheel in the framing of the machine. To get this room, the rear sill D of the platform is extended rearwardly, as shown at D'. In the usual construction of harvesters the sill F at the inner side of the main wheel is placed close enough to the main wheel so that it will furnish an attachment for the tongue G. The strain of the team upon the machine is thus transmitted directly through to the rear sill. When placed in this position, the large sprocket-wheel H is close to the side of the wheel and the smaller sprocket-wheel I is more nearly behind the main wheel B. Practical experience with such machines in the rice-fields has shown that the trash upon the ground will mix with the mud and form a tenacious mixture that will adhere to the wheel, get into the links of the chain, and soon throw the chain from the sprockets. In my improvement I have moved the inner sill F away from the wheel and carried the sprockets H and I toward the sill. The sill is not, however, continued in a straight line through to the front framing of the machine, but is bent in front of the sprocket-wheel H toward the main wheel and extended forward to the forward sill of the frame in order to furnish an attachment for the tongue G. It should be borne in mind that the position of the tongue must be practically the same on machines adapted for harvesting rice and grain. The team walks beside the standing crop, and there must therefore be sufficient room for an animal between the tongue and the standing crop. It also should be borne in mind that in order to balance the machine without side draft the main wheel must be positioned in the frame outside of the line of attachment of the tongue. The inner sill F is reinforced by a strong brace J, which extends toward the platform at both the forward and rear ends, the forward end attaching to the framing practically at the same point as the tongue-brace K. This formation of the inner sill thus gives room for the gearing to be separated from the main wheel and still furnishes a place of attachment for the tongue and its brace, whereby the great strain that necessarily follows from dragging the machine through the mud is transmitted to the rear of the framing, thus tying the machine securely together.

As before remarked, the mixture of mud and grass will adhere to the wheel with great tenacity. In all rice-harvesters that I have seen the sides of the wheels have been perpendicular or with an outward flare, it being the notion that the mud would not adhere when the sides of the wheels were built in this way. I have formed my main wheel, however, with a single row of spokes which are positioned in the hub as it is cast. The wheel is therefore much thinner at the hub than at the felly. It has a wide-tread face, which is supported on the spokes, and from the felly or rim a covering L is extended on both sides of the wheel to the hub. This covering incloses the spokes and flares inwardly. Experience has shown that in the soft mud of the rice-fields this inward flare of the sides makes the wheel run easier, as the covering is not called on to force a wider track, as it would if the covering were perpendicular with mud adhering to its sides or had an outward flare.

In the rice-machines that have been heretofore built scrapers and knives have been used to cut the mixture of mud and grass that adheres to the face of the wheel; but these scrapers and knives have been rigidly fastened to the frame. As the frame was raised and lowered on the main wheel these scrapers and knives would be thrown, because of the curvature of the bridles M, farther to or from the rim of the wheel. If they were placed close enough to do any good when the frame was at one extremity of its movement, they would be caught and torn from the machine when the wheel was at the other extremity of its movement. As a part of my improvement I have mounted these clearers so that they follow the main wheel in its movement. In the drawings I show one plan of making the clearers follow the movement of the wheel. On the cross-shaft N, to which motion is transmitted by a chain from the sprocket-wheel H by means of the sprocket-wheel I, I sleeve a casting O. This sleeve O not only supports the clearers, but it acts as a shield to the shaft. To the sleeve O clearers, such as P, are attached and project to the face of the wheel. In the drawings the clearer is shown projecting between the lines of the lugs E. The clearer is bolted to an arm $o$ on the sleeve O, and its position is regulated by the set-screw $o'$. The sleeve or casting O is rocked around the cross-shaft N, and the point of the clearer P is moved as the wheel goes up and down by an arm $o^2$, which rocks the sleeve. In the drawings this arm is shown as governed by the connecting-link Q, which is pivoted in the main frame A at one end and attached to the hub of the main wheel at the other end. As the frame of the machine is raised and lowered on the main wheel the connecting-rod Q occupies different positions, and thus moves the clearer P so as to make it conform to the position of the wheel in the frame. The necessity of having these clearers move so as to be kept close to the rim of the wheel is very evident to those who have had experience with rice-machines in the field. Whatever stuff gathers upon the wheel and stays for any length of time becomes so compacted that it will push the clearers away and many times bend them out of shape.

Having now described my invention, what I claim, and desire to secure by Letters Patent, is—

1. The combination, in a harvester for rice and the like, of a supporting-wheel, said wheel having a wide tread fitted with projecting lugs, and spokes inclosed and protected by closed sides, an elongated hub to the wheel, and a gear-wheel secured to the hub in a vertical plane inward from the plane of the tread of the wheel, with an intervening space between said gear and wheel-tread, whereby the dirt and trash which may be carried up by the wheel in its revolution will not drop onto the gear-wheel.

2. The combination, in a harvester for rice and the like, of a supporting-wheel having a wide tread and spokes inclosed and protected by closed sides, a hub to which the driving-gear is secured, said hub being elongated on the grainward side of the supporting-wheel so as to provide an intervening space between said supporting-wheel and the gear-wheel, a cross-shaft mounted on the frame at the rear of the supporting-wheel, and a drive-pinion located in the vertical plane of the drive-gear on the hub, whereby the dirt and trash which falls from the main wheel will not fall upon the gear or pinion.

3. The combination, in a harvester for rice and the like, of the main frame, the supporting-wheel, a draft-tongue connected to the frame at a point grainward from the wheel, and a cross-sill connecting the front and rear sills of the frame, the main portion of said cross-sill being located grainward from the line of the tongue to provide a space for the driving-gear on the grain side of the supporting-wheel and the front end of said sill being bent stubbleward into the line of the tongue.

4. The combination, in a harvester for rice and the like, of the main frame, the supporting-wheel, a draft-tongue connected to the frame at a point grainward from the wheel, a driving-gear on the inner end of the supporting-wheel hub, a driven pinion at the rear of the frame and in the vertical plane of the gear-wheel, and a cross-sill connecting the front and rear sills of the frame, the main portion of said cross-sill being located grainward from the line of the tongue to provide a space for said driving gear and pinion on the grain side of the supporting-wheel and the front end of said sill being bent stubbleward into the line of the tongue.

5. The combination, in a harvester for rice and the like, of a main frame, a main wheel adjustably positioned therein and having a wide tread, a clearer-bar pivoted on the main frame with its free end contiguous to the wheel and means whereby the free end of the clearer-bar is made to follow the wheel when the frame is adjusted on the wheel.

6. The combination, in a harvester for rice and the like, of a main wheel which supports the frame of the machine and on which the frame is adjusted, a clearer-bar mounted on the frame and adapted to follow the wheel as the frame is adjusted on the wheel.

7. The combination, in a harvester for rice and the like, of a main wheel on which the frame of the machine is mounted and on which it is adjusted, a clearer-bar mounted on a sleeve pivoted to the machine, and a connection between the sleeve and the hub of the main wheel, whereby when the frame is adjusted on the wheel the sleeve carrying the clearer-bar is rocked on its pivot.

8. The combination, in a harvester for rice and the like, of a main wheel on which the machine is mounted and on which it is adjustable for high and low cutting, a clearer-bar adjustably mounted on a casting pivoted to the frame of the machine, and a stiff connection uniting the clearer-bar pivot-casting with the hub of the main wheel.

JOHN W. PRIDMORE.

Witnesses:
BERT R. BENJAMIN,
WM. WEBBER.